(12) United States Patent
Saville et al.

(10) Patent No.: US 11,951,909 B2
(45) Date of Patent: Apr. 9, 2024

(54) VEHICLE MOUNTED ARTICULATING CAMERA

(71) Applicant: JSX Aerospace Holdings, Inc, Mesa, AZ (US)

(72) Inventors: Michael Saville, Gold Canyon, AZ (US); Connor Proffitt, Mesa, AZ (US); Justin Judkins, Mesa, AZ (US)

( * ) Notice: Subject to any disclaimer, the term of this patent is extended or adjusted under 35 U.S.C. 154(b) by 124 days.

(21) Appl. No.: 17/807,139

(22) Filed: Jun. 16, 2022

(65) Prior Publication Data

US 2022/0402435 A1    Dec. 22, 2022

Related U.S. Application Data

(60) Provisional application No. 63/212,977, filed on Jun. 21, 2021.

(51) Int. Cl.
| | |
|---|---|
| *B60R 1/27* | (2022.01) |
| *B60R 11/04* | (2006.01) |
| *G06F 3/04812* | (2022.01) |
| *G06F 3/04847* | (2022.01) |
| *G06F 3/0488* | (2022.01) |
| *H04N 5/33* | (2023.01) |
| *H04N 23/51* | (2023.01) |
| *H04N 23/53* | (2023.01) |
| *B60R 11/00* | (2006.01) |

(52) U.S. Cl.
CPC ............... *B60R 1/27* (2022.01); *B60R 11/04* (2013.01); *G06F 3/04812* (2013.01); *G06F 3/04847* (2013.01); *G06F 3/0488* (2013.01); *H04N 5/33* (2013.01); *H04N 23/51* (2023.01); *H04N 23/531* (2023.01); *B60R 2011/004* (2013.01); *B60R 2011/0085* (2013.01); *B60R 2011/0092* (2013.01); *B60R 2300/102* (2013.01); *B60R 2300/103* (2013.01); *B60R 2300/406* (2013.01)

(58) Field of Classification Search
CPC ............... B60R 1/27; B60R 2300/102; B60R 2300/103; H04N 23/51; H04N 23/531; H04N 5/33; G06F 3/04812; G06F 3/04847; G06F 3/0488
See application file for complete search history.

(56) References Cited

U.S. PATENT DOCUMENTS

| | | | | |
|---|---|---|---|---|
| 9,681,029 B2* | 6/2017 | Harrison | ............. | F16C 11/0609 |
| 9,984,566 B1* | 5/2018 | Mostofi | ............... | G08G 1/0175 |
| 10,686,984 B1* | 6/2020 | Schmidt | ................ | H04N 23/66 |
| 2004/0062541 A1* | 4/2004 | Kajino | ............... | F16M 11/2014 396/427 |
| 2014/0016922 A1* | 1/2014 | Greenthal | .......... | F16M 11/2014 396/419 |
| 2016/0100083 A1* | 4/2016 | Harrison | ............. | F16C 11/0609 348/373 |

* cited by examiner

*Primary Examiner* — Mohamed A. Wasel (57) ABSTRACT

An articulatable mount for temporarily affixing a camera and illumination system to a vehicle is disclosed. The articulating drive mechanism is lightweight, vertically compact, and ruggedized for severe service such as withstanding shocks from off-road travel and abrupt maneuvering. Articulation and illumination may be controlled remotely over Wi-Fi from inside or nearby the vehicle, and encrypted video feeds may be received by authorized users of an ad-hoc network of available smart-phone users and in-vehicle computer systems authorized and authenticated to participate in the network.

34 Claims, 8 Drawing Sheets

VEHICLE MOUNTED ARTICULATING CAMERA

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This non-provisional utility application claims the benefit of and priority to U.S. provisional application Ser. 63/212,977 "Vehicle Mounted Articulated Camera," filed 21 Jun. 2021. The entire contents of U.S. provisional application Ser. 63/212,977 "Vehicle Mounted Articulated Camera," filed 21 Jun. 2021 is hereby incorporated into this document by reference.

FIELD

The invention relates to articulating mounts for cameras so that on command a camera may be pointed in various directions or moved so as to track a moving object or person. In particular the invention allows a vehicle to be equipped with a camera which may be oriented and moved by a person inside the vehicle.

BACKGROUND

Spotlamps have been mounted on police and security vehicles so that a person inside the vehicle may illuminate scene upon arrival. Typical uses include situations where ever search lamps would be used, such as searching for objects without leaving the vehicle, or for illuminating persons on the scene for officer safety.

A common disadvantage is that typical designs use an articulatable available inside the vehicle which is connected to an articulatable search lamp mounted outside the vehicle, and the most common installation site has been a transverse mount passing through the "A" pillar of a car.

Perforating this portion of an "A" pillar has become increasingly undesirable for a number of reasons. Firstly, recent trends in vehicle designs have increasingly reinforced the frame members passing through the pillar so that forming the passage has required significantly more effort and expense. Perforating these frame components may compromise the structural integrity of the vehicle frame. Secondly, as the amount of electronics used within vehicles has increased, the pillar houses more and more electrical harnesses for cabin illumination, audio, vehicle cameras and proximity sensors, and electrically operated passive restraint systems such as air bags deployed by explosive squibs. Some systems include fiber optics, and in total it is becoming increasingly complicated to remove and reinstall all the electrical wiring systems and fiber optics passing through and "A" pillar in order to install a conventional handle-operated vehicle search lamp.

Lastly, once installed in a particular vehicle, a search lamp is not easily transferrable to another vehicle. The assembly presents a ponderous task to remove, leaves an external aperture exposing internal components of within the "A" pillar to the elements, and also leaving an internal aperture in the vehicle cabin which is at the very least unsightly, and leaving a direct passage from the car interior through to the outside is undesirable. Of course, installing the system into the next vehicle repeats the destructive and time-consuming operations perpetrated upon the first vehicle.

BRIEF DESCRIPTION

Cameras are being increasingly used in law enforcement and security situations, and increasingly, cameras are abetting illumination in vehicles so as to document people's actions and behaviors during an incident. It is a primary objective of the invention to offer an articulating mount for a vehicle mounted camera which avoids the necessity of having to drill through the "A" post of a vehicle.

Another objective of the invention is to provide articulating mount for an external articulatable mount for a camera which may be controlled by a person within the vehicle. A corollary objective of the invention is to offer an external articulatable mount for a camera which is temporary and easy to deploy and remove with no surface preparation required. Another corollary objective of the invention is to provide a vehicle mounted system which may be easily moved from one vehicle to another.

Another objective of the invention is to provide an external articulatable mount for a combination camera and search lamp. Yet another objective of the invention is to provide an external articulatable mount for a camera which is a thermal imaging camera.

Another objective of the invention is to provide portable and remote means for pointing a camera or a pivotable assembly which may include a camera and an illumination source such as a spotlamp, so that a person outside a vehicle may operate the vehicle-mounted camera not only from inside the vehicle but also from or near an incident site within range of the camera and light.

Yet another objective of the invention is to provide a secure wireless network comprising a plurality of cameras and a portable and remote means where an authenticated participant in the network may select and view a datastream from among any of the cameras. A corollary objective of the invention is to provide a portable and remote means for pointing the camera at an objective or an event and for controlling on and off states for a spotlamp associated with a camera.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 5b shows a rear view of the weight-reduced, ruggedized electronics cage of FIG. 5a.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

"Operably coupled" in this specification refers to two or more components having a mechanical, electrical, or a software enabled relationship so that they work together. Components that are operatively coupled may not necessarily touch physically while one acts on the other.

The invention provides an articulatable mount for temporarily affixing a camera and illumination system to a vehicle is disclosed. The articulating drive mechanism is lightweight, vertically compact, and ruggedized for severe service such as withstanding shocks from off-road travel and abrupt maneuvering. Articulation and illumination may be controlled remotely over Wi-Fi from inside or nearby the vehicle, and encrypted video feeds may be received by authorized users of an ad-hoc network of available smartphone users and in-vehicle computer systems authorized and authenticated to participate in the network. Also, besides operating within the visible light spectrum a camera in accordance with the invention may also operate in thermal imaging modes. Thermal imaging cameras may be preferred in a majority of implementations and uses within the field of the invention.

This articulating camera assembly is lighter and more rugged than other products currently available and being sold at much higher costs. It also offers a lower profile than other competitive products so that when the vehicle is operating at speed the assembly has less aerodynamic drag force to resist at the mount interface to the vehicle.

A wireless interface for a camera operable in both visible light and thermal imaging modes controls both the selection between these modes, the transmission format, such as handling public or private encryption keys, and also the digital compression modes of the video stream, such as converting from NTSC to VGA for streaming to laptop or other devices over Wi-Fi using either peer to peer or local networks established within proximity of the vehicle. Larger area secure networks may also be established to coordinate information flow between persons in or near the vehicle and other members of a mission team in range of the vehicle or between other vehicles participating in the network. For example, a first contact vehicle acquires a "suspicious target" which may be a person of interest or an escaped animal, and a vehicle operator or other authorized network participant may transfer a live feed from the camera plus auxiliary information to area vehicles and vehicles en-route to assist with the incident response.

Video data files are admissible evidence of behaviors and actions of person of interest, and may be stored on SIM cards, SD cards, and other non-transitory computer-readable mediums such as a data storage and retrieval system included on a printed circuit assembly or printed circuit board (PCB) housed within a protective electronics cage of the invention.

For all figures, reference numerals and reference letters for elements described in any one figure represent the same elements as they appear and are referenced in any other figures, without requiring redundant recitation of the same description in those other figures.

Figure 1:
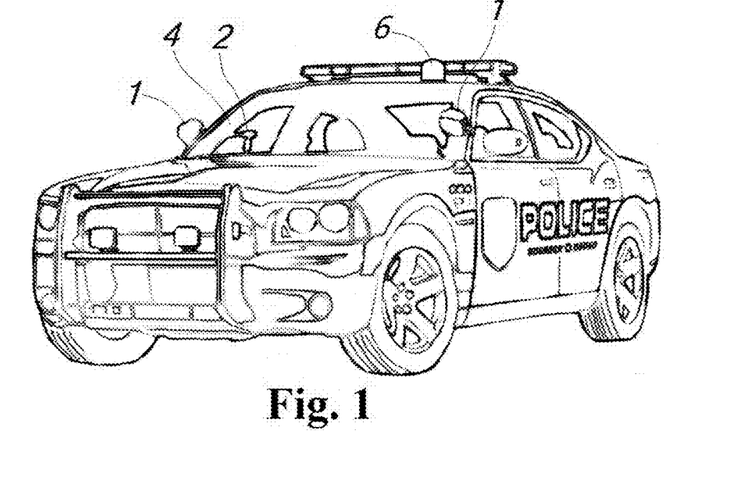
FIG. 1 shows a typical vehicle equipped with articulatable search lamps which are mounted through the "A" pillars of the vehicle.

FIG. 1 shows a typical vehicle equipped with articulatable searchlamps [1] which are mounted through the "A" pillars [4] of the vehicle. The driver or front-seat passenger have access to mechanical handles [2] for directing the searchlamps at objects or persons of interest. This arrangement poses several disadvantages: firstly, that the lower elevation of the mount at its through point in the vehicle "A" pillar limits the effective illumination range of the spotlamp; secondly, the effective range of azimuth or sweep of the spotlamp is limited by the "A" pillar, and thirdly, if a person of interest moves from one lateral quarter of the vehicle, across by the front and to the other lateral quarter, the person inside the vehicle in one seat will have to reach across within the vehicle interior to begin operating the spotlamp handle installed for the other seat, which is an ungainly movement incurring delay and inconvenience and compromising of officer safety.

In comparison, magnetically affixing the inventive lamp and camera mount on the vehicle roof ahead of the light bar as in [6] offers immediate advantages. The higher elevation of the mount allows the spotlamp to penetrate further afield, wireless remote control allows anyone in any seat to operate and sweep the lamp with equal ease, unlike pivoting a handle with wrist motions, finger control of an app on a smartphone or motions of a computer mouse require no substantial amounts of force and can be rapid and responsive to motions of the person of interest held in the light beam.

The invention offers improved performance in tasks of finding people trying to conceal themselves, and when operating a camera in thermal imaging mode an officer may find discarded objects recently carried by or touching persons attempting to evade discovery by the camera detecting residual body heat remaining on these objects. Some criminals discard carried weapons, stolen property, and contraband to attempt to dissociate themselves from the articles which were in their possession, and video recordings of thermal images may re-connect these articles of evidence with to people who furtively discarded them.

Figure 2:
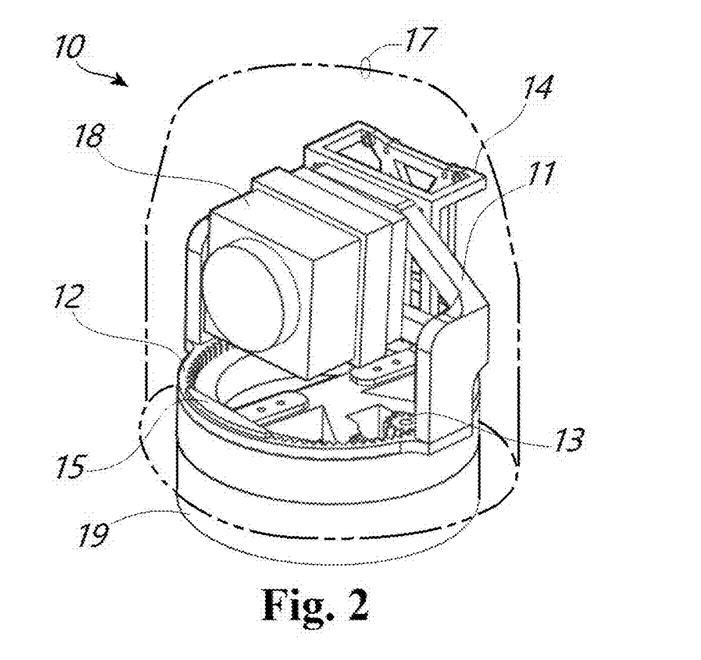
FIG. 2 shows an embodiment of a vehicle mounted articulating camera assembly in accordance with the invention.

FIG. 2 shows an embodiment of a vehicle mounted articulating camera assembly [10] in accordance with the invention. A camera [18] is secured to a weight-reduced articulating frame [11.] The camera may operate within the visible light spectrum or may be a thermal imaging camera or a camera operable in both modes. Electronics for computer control, video processing, data storage, and secure, encrypted wireless communications are housed in a ruggedized cage [14.] Mounting brackets [15] provide bearing surfaces for rotation and thrust loads of a ring gear [12] having internal teeth. The articulating frames is secured to the rotatable ring gear. The mounting brackets attach to a base [19] having magnets to affix itself to sheet metal surfaces of a vehicle, most commonly a steel roof of a car. The magnetic base may attach to other surfaces such as the trunk of a car, truck trailers, or other surfaces made for materials attractable by magnets so that the camera may surveil any area of interest. When mounted on the trunk of a vehicle it may be used to assist backing up or parking, or reverse motion of a vehicle towing a trailer such as launching a boat at a boat ramp. The magnetic attachment requires no mounting preparations, leaves no holes or hardware, and is easily moved from one deployment site or vehicle to another.

The components of the vehicle mounted articulating camera including the base and rotatable frame may be housed in a ruggedized transparent shell [17] or dome made of an impact resistant transparent material such as polycarbonate, acrylic, Lexan®, Plexiglass® or Persipex®.

Figure 3:
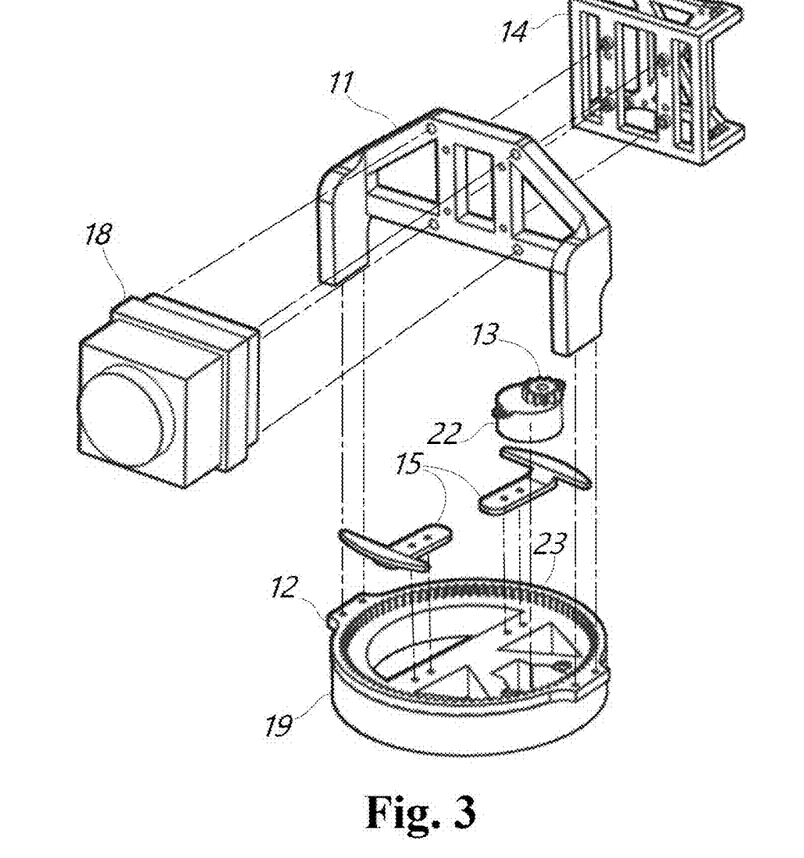
FIG. 3 shows the vehicle mounted articulating camera assembly of FIG. 2 with some components exploded.

FIG. 3 shows the vehicle mounted articulating camera assembly of FIG. 2 with some components exploded for further detailed discussion. The camera [18] and a weight-reduced electronics cage [14] attach to a weight-reduced articulating frame [11] which is secured to a ring [12] having an annular array of gear teeth [23] which define an axis of rotation for the frame and the camera. At least one bracket [15] attaches to the base [19] so as to constrain the ring to rotation about the axis of rotation. The brackets shown include arcuate bearing surfaces and the internal teeth ride along these surfaces in rotation. For axial constraint, a thrust surface on the ring rides upon a complementary thrust surface of the base, and the brackets also include T-shaped surfaces which axially capture the ring. According to preferred embodiments the ring further comprises a cylindrical surface and an end face which seat within a circular groove in the base. The cylindrical surface is constrained to axial rotation by a sidewall of the groove, the end face seats within the floor of the groove for thrust support of the articulating components, and the undersides of the brackets capture the ring within the groove of the base.

An alternative construction uses partial circular equivalents to the circular structures recited above, so that arcuate radial and thrust surfaces of the ring interoperate within arcuate grooves in the base for a camera assembly where angular sweeps of searchlamps and cameras comprising less than a complete revolution are sufficient. For example, a low-profile roof mounted product affixed to a vehicle roof just ahead of a light bare need only be able to traverse about 180° of azimuth.

A motor-driven gear meshes with the gear teeth of the ring. The motor [22] has an output shaft with a spur gear [13] mounted to it. The motor is secured within an aperture of the base so that its mass resides as low as possible with in the assembly to lower the center of gravity of the entire assembly, and that by not being among the rotating components of the assembly, the rotational inertia of the devices is also advantageously reduced so that the camera and lamps may be pivoted quickly.

However, with the motor and power source such as a battery or wiring from an external cable being attached to the non-rotating base, umbilical wiring which connects to the camera, lamp, and other electronics are passed through a commutator or a rotating electrical connector. Where an anticipated number of 360° rotations is few or seldom, the rotational axis of the electronic connector may be offset from the rotational axis of the ring and frame.

The electronics housed within the frame may include a microcomputer on a compact PCB, control interfaces for the motor drives such as stepper motor drivers for and other mechanical systems, and voltage regulator to convert from automotive 12V to 5V which is common for computer electronics. Where the invention includes internal battery power, the battery may be charged or augmented by umbilical power connected from the vehicle light bar or a power cord and end connected adapted to draw power from a cigarette lighter or USB port within the vehicle console. According to alternative variants within the scope of the invention, the motor, battery, and electronic assemblies may reside within the rotating or the stationary portions of the assembly. Nevertheless, advantages are available when as much of the mass of these components as is practicable are located within the non-rotating portions of the assembly. Besides an umbilical connection, a slip ring connector or a commutator and brush style rotary connector may be used for electrical interconnections between components in the base and in the rotatable frame. These sorts of rotary inter-connects allow the frame an unlimited number of rotations in either direction with respect to the base.

Figure 4:
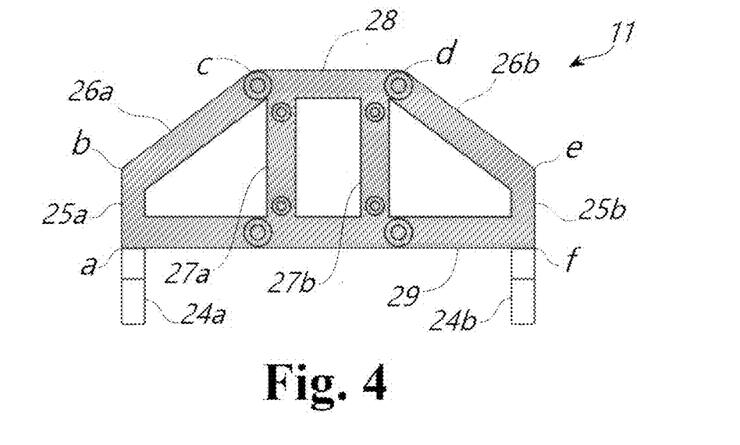
FIG. 4 shows an embodiment of an weight-reduced articulating frame component in accordance with the invention.

FIG. 4 shows an embodiment of an weight-reduced articulating frame component in accordance with the invention. Preferred frame materials include polylactic acid (PLA,) glass filled polycarbonate, acrylonitrile-butadiene styrene (ABS,) polyetherimide (PEI,) and poly-phenylene sulphone (PPS.) Lightweight metals such as tempered aluminum and especially 6061-T6 or 7575 series alloys may also be suitable.

Two support struts [24a, 24b] descend from beneath a bottom beam [29] and include affordances for fasteners which secure the frame to the ring. First and second end beams [25a, 25b] extend from the first and second ends of the bottom beam. First and second vertical members [27a, 27b] extend from intermediate sites disposed along the length of the bottom beam. A top chord [28] spans between a first end or upper end of the first vertical member and a first end or upper end of the second vertical member. A first end post [26a] spans between the first end of the first end beam and the first end of the first vertical member, and a second end post [26b] spans between the first end of the second end beam and the first end of the second vertical member.

To define a degree of weight-reduced design in the frame, a perimeter is defined along extremities of the first end beam [a] to [b,] the first end post [b] to [c,] the top chord [c] to [d,] the second end post [d] to [e,] the second end beam [e] to [f,] and the bottom beam define [f] back to [a] which encloses a first area. The sum of all areas of all apertures residing within the perimeter define as second area, and for a weight-reduced design the second area is at least 40% of the first area. In an exemplary design shown in the figure, the perimeter of the frame encloses an area of about 6231 mm$^2$ (9.658 in$^2$) and the three apertures comprise about 3608 mm$^2$ (5.592 in$^2$,) which means that the frame is weight-reduced by about 42% of that of a solid planar membrane bounded by [a-b-c-d-e-f.] The shaded portion of this figure highlights the first area with the second area subtracted from it.

Figure 5A:
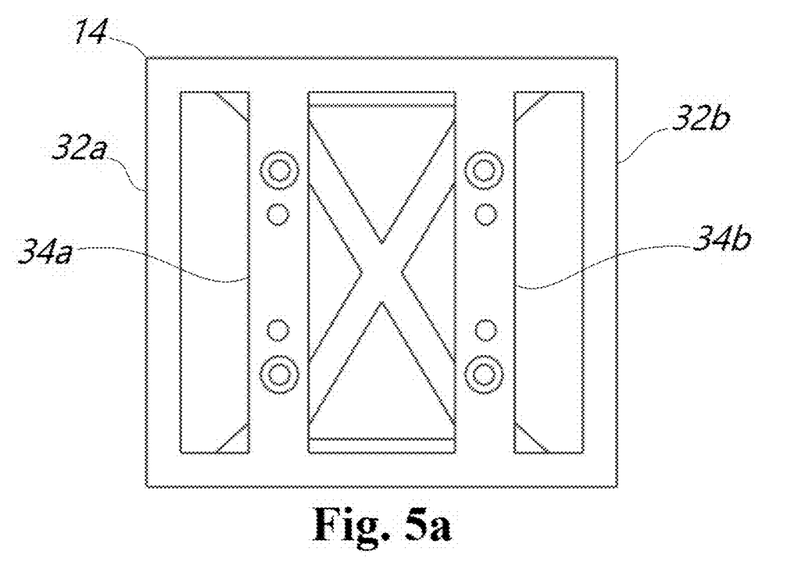
FIG. 5a shows a front view of an embodiment of a weight-reduced, ruggedized electronics cage in accordance with the invention.

FIG. 5a shows a front view of an embodiment of a weight-reduced, ruggedized electronics cage [11] in accordance with the invention. The cage comprises a front frame and a rear frame which are rectangular and longitudinally spaced apart and connected by beams spanning respective corners to form a parallelepiped, with the front frame comprising leftmost and rightmost parallel members [32a] and [32d] and further comprising at least two medial members [34a] and [34b] having attachment affordances for securing to the articulating frame. According to a preferred embodiment the attachment affordances are a square array of threaded apertures, so Frame pattern so that the cage may be attached to the frame oriented in any of the four thusly defined cardinal directions.

Figure 5B:
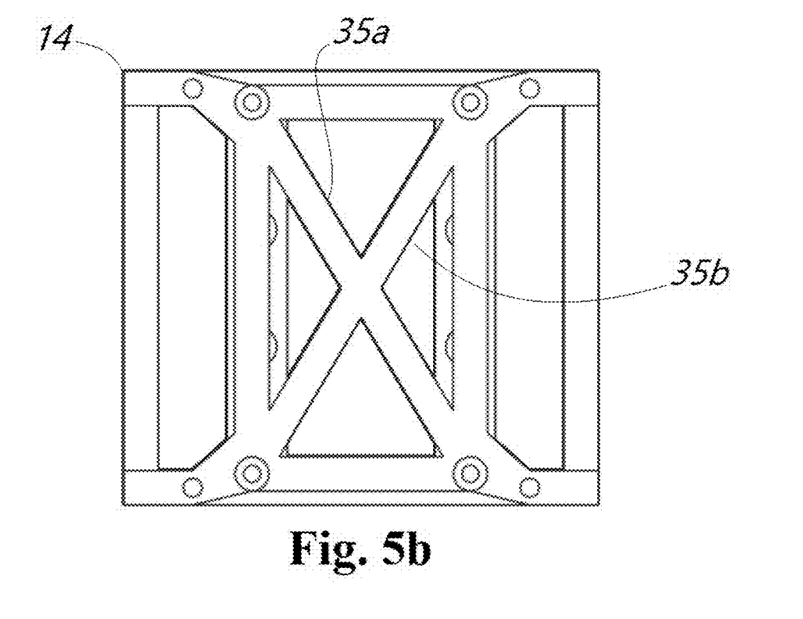

FIG. 5b shows a rear view of the weight-reduced, ruggedized electronics cage [14] of FIG. 5a. The rear frame includes a plurality of reinforcing members among which at least two [35a, 35b] intersect each other to form a saltire.

Figure 6:
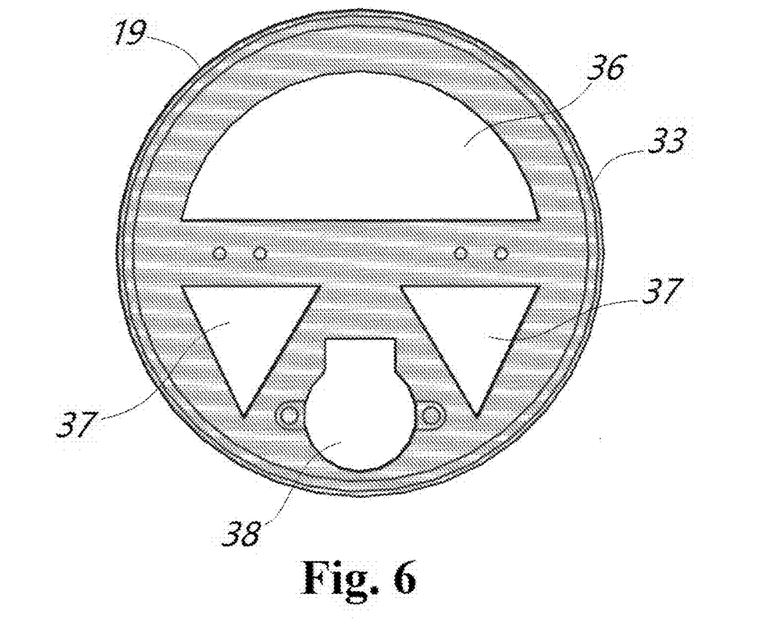
FIG. 6 shows a weight-reduced mounting base for the vehicle mounted articulating camera assembly of FIG. 2.

FIG. 6 shows a weight-reduced mounting base [19] for the vehicle mounted articulating camera assembly of FIG. 2. The base includes a circular groove [33] for receiving guidable elements of the ring [12 of FIG. 3.] By constraining these guidable elements within a circular path, the motion of the ring is constrained to rotation about an axis defined by the center of this circular groove. The groove may also be fashioned as one or a series of concentric arcuate portions or obstructions may be inserted into the groove to restrict azimuth travel of the ring to within a predetermined angular operating range. Weight reducing apertures include a circular chord aperture [36] and at least one triangular aperture [37.] A circular or keyhole aperture [38] is included to receive the drive motor.

With the circular perimeter of the base defining a first base area, the sum of the apertures defines a second base aperture area, and in a preferred embodiment these apertures in base comprise at least 60% of first base area. The shaded portion of this figure highlights the first base area with the second base aperture area subtracted from it. In an exemplary embodiment, the first base area is about 11310_$^2$ (17.530 in$^2$) and the second aperture base which is the sum of the areas of the apertures is 6987 mm$^2$ (10.830 in$^2$) which results in a weight reduction by area of about 62%.

Magnets for creating attraction forces to attractable materials of vehicles or other installation sites may be deposited within the apertures of the base. Preferred materials include soft iron and rare earth elements such as neodymium, which is a permanent magnet made from an alloy of neodymium, iron, and boron.

Figure 7:
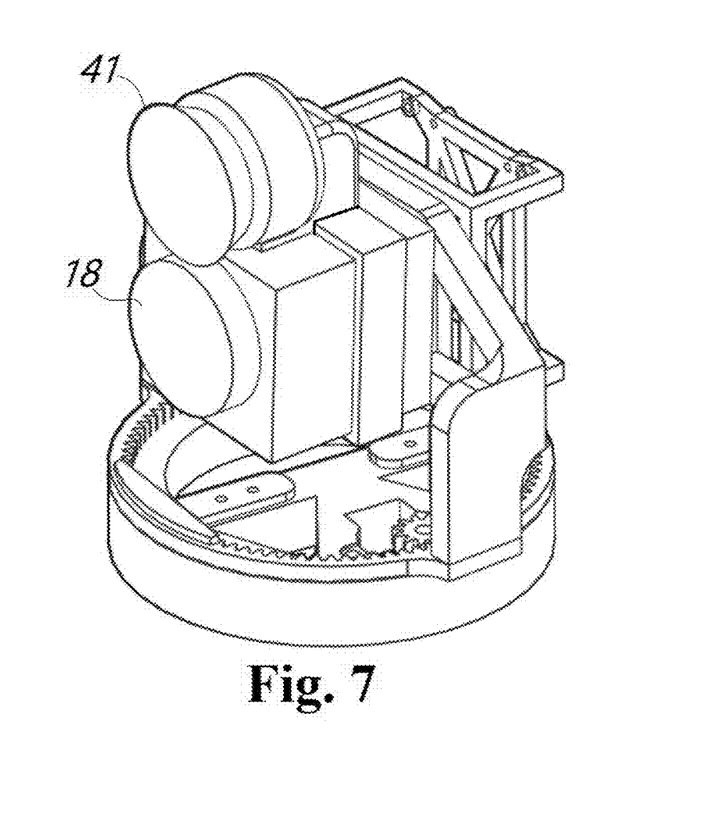
FIG. 7 shows an alternative embodiment of a vehicle mounted articulating camera assembly further comprising a searchlamp oriented parallel to the optical axis of the camera.

FIG. 7 shows an alternative embodiment of a vehicle mounted articulating camera assembly further comprising a searchlamp [41] having a light source with a light emission axis parallel to the optical axis of the camera [18.] Other light sources suitable for use with the invention include LEDs and LED arrays, incandescent bulbs, infrared emitters, ultraviolet emitters, a fluorescent light source, and a flash bulb.

Figure 8A:
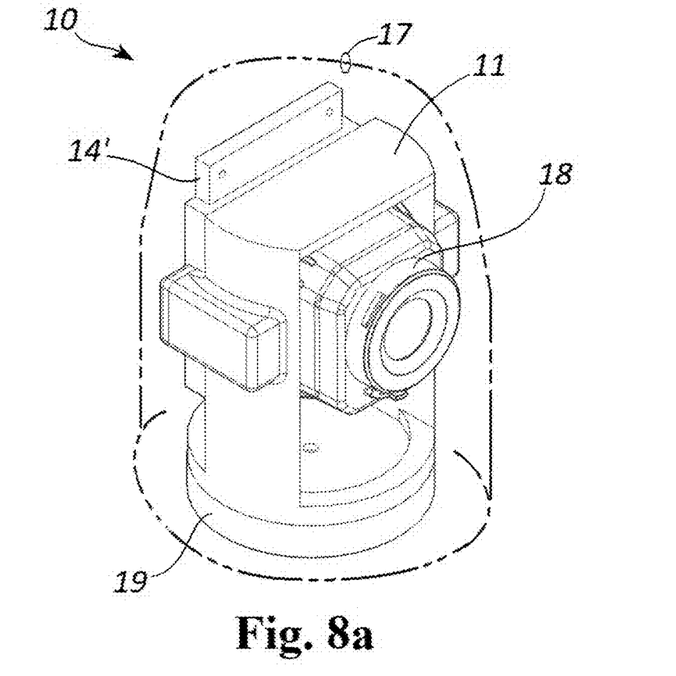
FIG. 8a shows an alternative embodiment of a vehicle mounted articulating camera in accordance with the invention.

FIG. 8a shows an alternative embodiment of a vehicle mounted articulating camera in accordance with the invention [10.] The components of the vehicle mounted articulating camera including the base [19] and rotatable frame [11] may be housed in a ruggedized transparent shell [17] or dome. The base may preferably comprise a magnetic material to allow secure but temporary and non-destructive adhesion to the roof of a vehicle or another appropriate surface. The camera [18] is preferably a digital camera and may also operate within and beyond the visible light spectrum such as a long wavelength thermal imaging camera sensitive to light wavelengths including a range between 7 and 15 microns. A single board computer (SBC) such as a "Raspberry Pi" or "Arduino" may be mounted between the camera and a backplate [14'] attached to the frame.

Figure 8B:
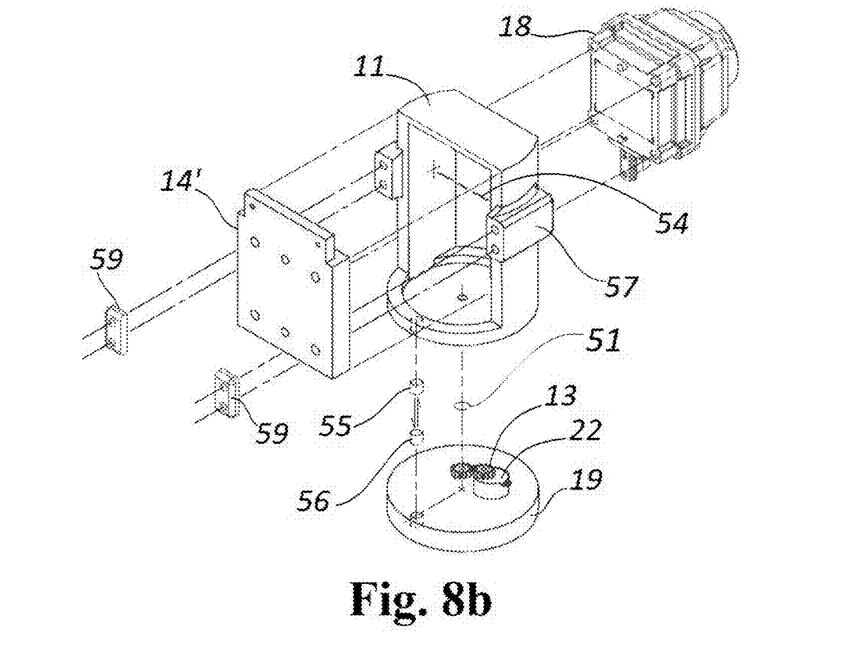
FIG. 8b shows the vehicle mounted articulating camera assembly of FIG. 8a with some components exploded.

FIG. 8b shows the vehicle mounted articulating camera assembly of FIG. 8a with some components exploded. A base [19] has a frame [11] rotatably coupled to it so as to define a first axis of rotation [51] for the frame for azimuth rotation and orientation of a camera [18] mounted to the frame. A first motor [22] is attached to the base and operably coupled to the frame. A first camera [18] operable to generate a video datastream is mounted to the frame. The motor is preferably stepper motor so that a gear ratio between the motor output shaft and the axis of rotation of the camera may be used to calculate quantities of step commands issued to the motor in order to effect a desired angular rotation of the frame with respect to the base. In this embodiment a spur gear [13] attached to a drive shaft of the motor engages a radial array of teeth affixed to the frame. However, other sorts of power transmission interconnections between the motor and the rotatable frame also reside within the scope of the invention, such as belt drive or direct drive systems.

Besides rotating the camera and frame in an azimuth direction, another set of embodiments within the scope of the invention include that the camera is mounted to the frame by a gimbal rotatable about a second axis [54] perpendicular to the first axis of rotation. Bearings and motor actuator components to dip or raise the elevation angle of the camera objected are housed in one or both transverse lobes [57] of the frame, and access to these components is capped by lobe end caps [59.] A second motor operably coupled to rotate the camera about the second axis resides within one of the lobes.

The first processor is also operable to compute and transmit as data an azimuth orientation of the camera with respect to the frame by means of a rotary encoder operable about the first rotational axis. However, when not in use and power de-energized from the system, digital values stored memory pertaining to the azimuth orientation of the frame with respect to the base would be lost between usages of the facility system.

To restore useful azimuth values within the processing system, a first physical sensor [55] is affixed to the frame and a first sensor triggering element [56] is affixed to the base. The sensor triggering element triggers the first sensor when the frame is oriented about the first axis with the first sensor proximate to the first sensor triggering element. Examples of a sensor and a complementary sensor triggering element include but are not limited to a light sensing element and a light source such as an LED and photocell, or a Hall effect sensor or a magnet sensitive reed switch and a magnet, or a cantilever reed switch on one component and a peg on the other component which electrically closes a cantilever beam switch when impinged by the peg. A light sensing system may be triggered by having a blade rotate with respect to the light source or light sensor so that the blade occludes a light beam when a particular rotational alignment of the two rotationally coupled components occurs.

The first processor is also operable to compute and transmit as data an elevation orientation of the camera with respect to the frame by means of a rotary encoder operable about the second rotational axis, by means that the frame includes a second sensor affixed to it and a second sensor triggering element on the camera which triggers the second sensor when the camera is oriented about the second axis with the second sensor proximate to the second sensor triggering element. The second sensor and its triggering element may be selected from the embodiments described for the azimuth detection and control components.

It is possible with these sensors and sensor triggers to define a "home" azimuth and "home" elevation which may be registered as encoded positions in the microprocessor memory upon system start-up by rotating the frame until the frame sensor trigger triggers the frame sensor. Similarly, a "home" elevation may be restored in memory by an elevation excursion of the camera pivoting within its gimbal until the elevation sensor trigger aligns with the elevation sensor.

In summary, the camera pointing facility further comprises a sensor affixed to the frame and a sensor triggering element on the base which triggers the sensor when the frame is rotated with the sensor proximate to the sensor triggering element, for azimuth or yaw pivoting and control and for establishing an azimuth "home" orientation. The camera pointing facility may also further comprise a sensor affixed to the frame and a sensor triggering element on the camera which triggers the sensor when the frame is rotated with the sensor proximate to the sensor triggering element, for elevation or pitch control of the camera and for establishing an elevation "home" orientation.

Figure 9:
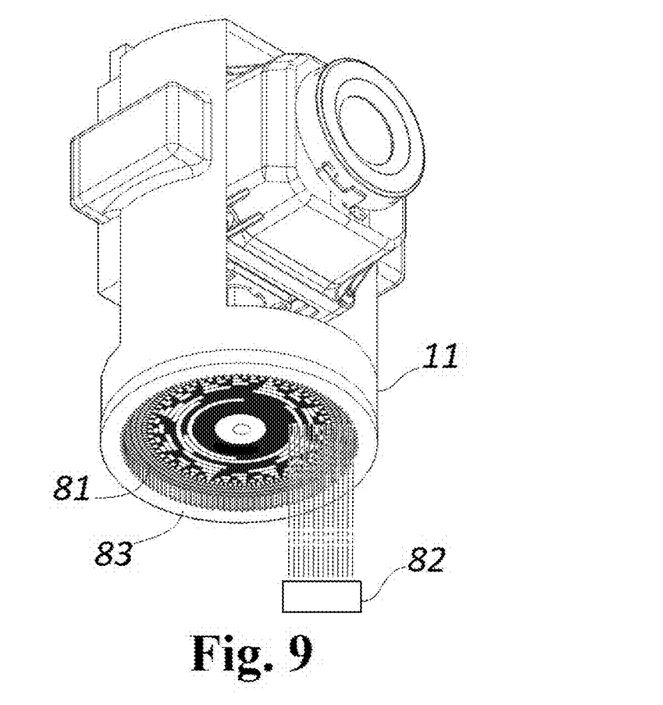
FIG. 9 shows an alternative embodiment of a pivotable frame for a vehicle mounted articulating camera in accordance with the invention which includes optical encoding for azimuth determination and control.

FIG. 9 shows an alternative embodiment of a pivotable frame [11] for a vehicle mounted articulating camera in accordance with the invention which includes optical encoding for azimuth determination and control. A rotary optical encoding pattern [81] comprises concentric sets of binary-colored arc segments which are readable by an optical encoding sensor [82] operably connected to the first processor, and with the frame [11] further comprising an optical encoder pattern for absolute or incremental encoding. The frame may also comprise a toothed ring [83] comprising internal teeth for engagement with the spur gear [22] of FIG. 8b. The assembly between the base and rotatable frame may also include a thrust bearing.

Figure 10:
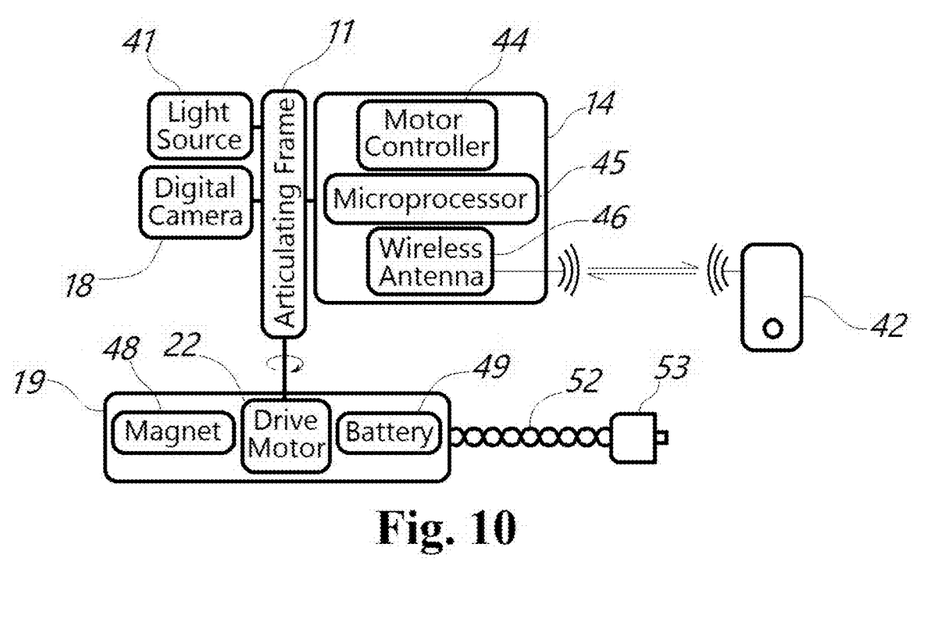
FIG. 10 shows a schematic representation of the components of the invention.

FIG. 10 shows a schematic representation of the components of the invention. An articulating, rotatable frame [11] supports a digital camera [18] which preferably operates within and beyond of the visible spectrum to provide thermal imaging or other optically detectable information. A light source [41] is also coupled to the frame so as to illuminate targets or objects or persons of interest. A ruggedized frame [14] houses and protects a motor driver or motor controller board [44] such as a stepper motor driver, a microprocessor [45,] and/or a wireless antenna [46] for receiving commands and for exchanging data such as video files of recorded incidents or live feeds from the camera. Commands and data may be exchanged with a smart-phone [42] or other authorized and authenticated devices participating in a locally established secure wireless network. The invention and other networked devices preferable include non-transitory computer-readable mediums such as a data storage and retrieval system.

The swivelable components are rotatably coupled to a magnetic base [19] which includes a drive motor [22,] magnets [48] for adhering to magnetically attractable materials, and an optional battery [49] rechargeable by a power cord [52] fitted with a power plug [53] complementary with power sockets commonly found in vehicles such as for 12V cigarette lighters and USB ports.

The invention comprises both physical and software components to provide a camera pointing "facility," which is this specification is defined to include a system or arrangement of interoperating components which provide a service or which enable one or more tasks or available options to be easily comprehended, selected, and executed.

In the disclosed facility system, a first processor [45] inoperable to compute and transmit as data an azimuth orientation of the frame with respect to the base, and a second processor [42] operable to receive the video datastream from the first camera, operably coupled to a touch sensitive display screen, and operable to display on the display screen the video datastream from the first camera. The first and second processors communicate over a secure wireless network, and both processors must be authenticated in order to participate in the network. The first processor configures a first software socket and the second processor configures a second software socket, and the video datastream from the camera is transmitted from the first processor to the second processor. A preferable communication mode for video datastream transmission is User Datagram Protocol (UDP.)

The first processor also configures a third software socket and the second processor configures a fourth software socket, and motor articulation commands are transmitted from the second processor to the first processor. A preferable communication mode for motor articulation commands is Transmission Control Protocol (TCP.) In this specification a "software socket" is an abstraction related to a physical electrical interconnect socket. A physical socket is an entry point for a power or a data cable. A software socket is also an entry point but instead of accepting a cable it accepts a network connection from another computer.

Figure 11:
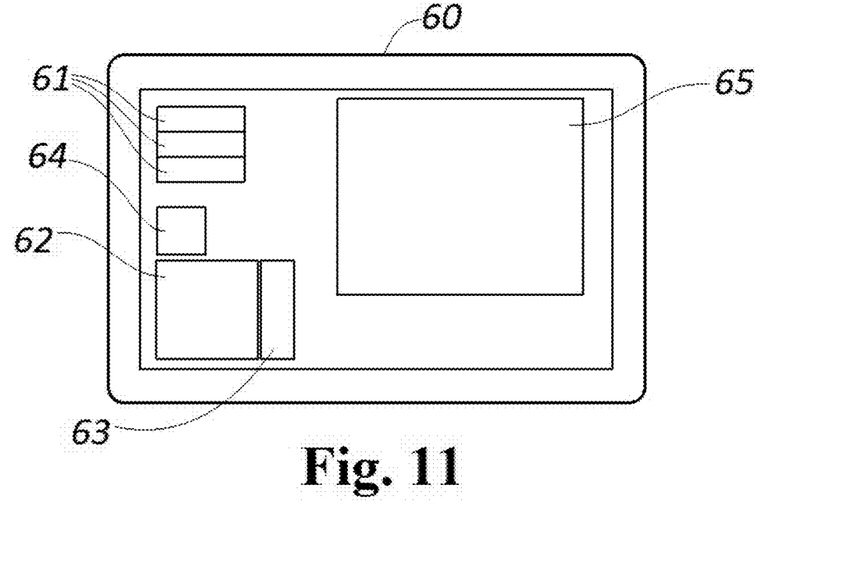
FIG. 11 shows a stylized representation of a display for a portable microprocessor in use with the invention.

FIG. 11 shows a stylized representation of a display for a portable microprocessor [60] such as a smartphone or a tablet computer in use with the invention. This device is a second microprocessor and in use it defines and displays a plurality of touch sensitive regions and their visible boundaries.

A first touch sensitive region [62] is used for azimuth control commands issued to a camera controlled by the facility. A second touch sensitive region [63] is used for elevation control of a selected camera. A third touch sensitive region [64] is for turning on and off a spotlamp attached to and aligned with the camera as in FIG. 7.

Another touch sensitive region [61] operates as a nested multiple select menu for programming system settings, selecting an active camera to participate as a first camera within the facility, and for authenticating the portable device, other portable devices, and other cameras to enable them to participate in the secured facility network. Another display area [65] displays a live video datastream as received from the selected camera. The network is configurable so that any authenticated tablet or smartphone within the network may select, access, and control any camera in the system, and more than one tablet or smartphone may access the same datastream from a particular selected camera.

Figure 12A:
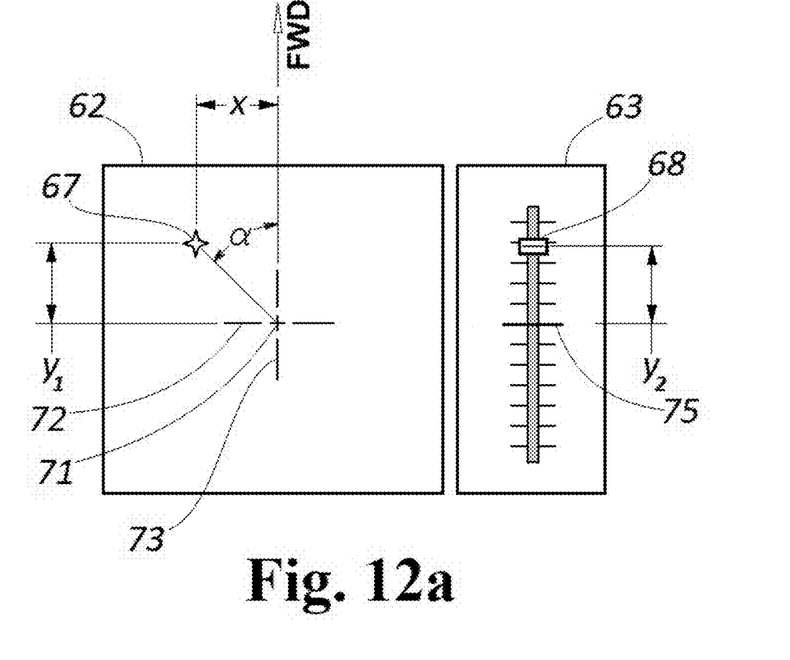
FIG. 12a shows a stylized representation of a first and a second touch sensitive regions defined and displayed in accordance with the invention.

FIG. 12a shows a stylized representation of a first and a second touch sensitive regions defined and displayed in accordance with the invention. Within the first touch sensitive region [62,] the second processor operates to define an origin [71] with an ordinate [73] and an abscissa [72] both passing through the origin. The ordinate, abscissa, and origin may or may not be displayed according to various embodiments of the invention. Upon operating to detect a contact point of a user's touch within the first touch sensitive region, the second processor is further operable to display a first cursor [67] at a location of the user's contact point. Software is then used to mathematically determine a target angle [a] between the ordinate and a line passing through the origin and the contact point.

The second processor is operable to determine a first distance [x] from the ordinate to the contact point and to determine a second distance [$y_1$] from abscissa to the contact point. The first cursor acts as a joystick and will pivot around the origin point if a user makes contact at another point within this first region. While the cursor pivots, the articulated camera on the vehicle also swings along an azimuth to point in a direction in accordance with the angle [a] with respect to the "home" position or orientation of the camera system. In a preferred embodiment and method of use, the base is arranged and oriented on the vehicle so that the "home" position is analogous to a forward looking view ahead of the vehicle [FWD.] Thus, moving the cursor by a sliding or arcuate motion of a user's contact point, or by a user tapping a point on the ordinate line above the abscissa would send motor commands over the network which would cause the stepper motor to rotate the frame so that the camera points to a view looking straight ahead of the vehicle.

The second processer is further operable to define and display on the display screen a second touch sensitive region [63,] and within the second touch sensitive region to display a slider having a second cursor [68] slidable along a slide axis. The second cursor is displayed at a point along the slide axis analogous to an elevation orientation of the camera, and upon operating to detect a contact point of a user's touch within the second touch sensitive region, the second processor is further operable to move the cursor to a location of the user's contact point and mathematically determine a target elevation for the camera.

According to a subset of embodiments within the scope of the invention, the second touch sensitive area may also display a second abscissa line [75] which represents a particular "home" elevation such as perpendicular to the rotational axis of the frame and substantially level with respect to the vehicle. If the vehicle is parked on horizontal ground, then this home elevation would also be substantially horizontal. Adjustments are also possible to compensate for situations with the camera system being affixed to a sloped roof or other non-horizontal portion of a vehicle. The user may slide the second cursor to a point at a third distance [$y_2$] from the second abscissa, and the articulated camera on the vehicle also pivots to an elevation with respect to the "home" elevation or orientation of the camera system.

In both azimuth and elevation articulation, the stepper motor counts steps from the home position and the software converts steps to an angular displacement, and sends commands to the stepper motor whereby the desired angular displacement is expressed as an appropriate number of stepper motor steps. The user is also able to save and store camera orientations so that these may be recalled and the camera returned to a saved or stored orientation after other excursions commanded by the user.

Figure 12B:
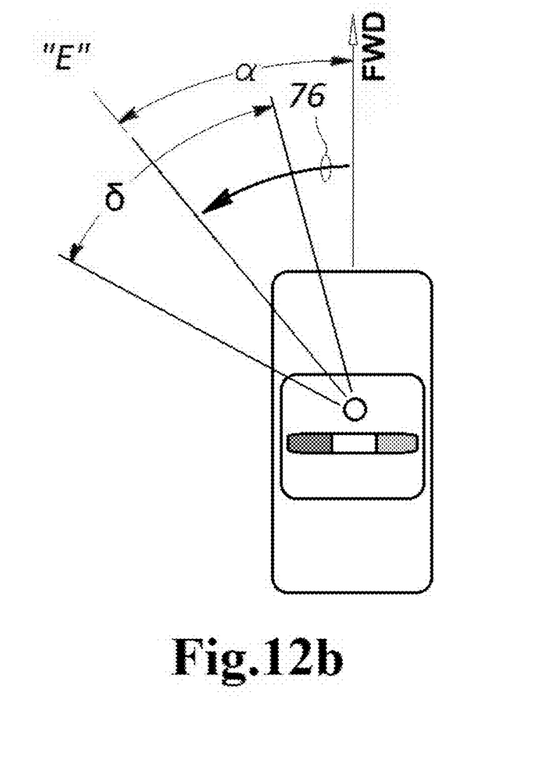
FIG. 12b shows a stylized representation of a top view of a patrol or security vehicle equipped with a vehicle mounted articulating camera in accordance with the invention.

FIG. 12b shows a stylized representation of a top view of a patrol or security vehicle equipped with a vehicle mounted articulating camera in accordance with the invention. In using the facility, a user inside or outside the vehicle observing an object, person, or event at "E" with respect to the patrol vehicle may first orient the display of the second processor so that a relationship between the "home" azimuth of the articulated camera and the vertical orientation of the tablet display, sweep the first cursor within the first contact area or tap at a point which is a particular angle with respect to the origin and ordinate analogous to the a bearing angle [a] from "FWD" of the vehicle to the site "E," and then the camera will rotate so that its objective captures "E" in its video datastream. The angle of the field of view of the camera is shown by angle [δ] in this figure, and the azimuth motion of the camera is depicted by arrow [76.]

In detail, this motion occurs when either processor from among the first and second processor is operable to determine a difference between the azimuth orientation of the frame and the target angle, and to actuate the first motor to rotate and orient the frame to the target angle. For elevation control, either processor, the first or the second, is operable to determine a difference between the elevation orientation of the camera and the target elevation, and to actuate the second motor to rotate and orient the camera to the target elevation.

Figure 12C:
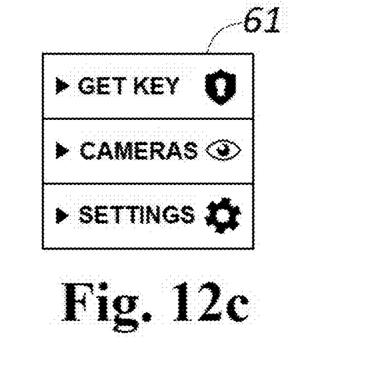
FIG. 12c shows a touch sensitive region in accordance with the invention operable as a nested multiple select menu.

FIG. 12c shows a touch sensitive region in accordance with the invention operable as a nested multiple select menu. The top-level selections of this menu are shown in this figure, and include a facility for securely authenticating the second processor or other components to be added to an existing wireless network active within the scope of the invention, or to add or select which camera from among a plurality of available cameras authenticated to the network shall act as the "first camera" of this specification displaying its video datastream to the display connected to the second processor. A "settings" icon includes other device management settings including but not limited to user profiles, touch sensitivity, other connection parameters for the wireless network, display controls for brightness, contrast, colors and themes, and other options for what, how, and where the graphic elements of the facility system are displayed. The indicia displayed as each menu item may change depending on which camera or type of device is selected and the state of sub-menu activities represented by the displayed indicia. For example, if the second processor is properly authenticated to the network, the background area around the "Get Key" text may be displayed as green or an anodyne color. If a connectivity problem is occurring or if the device is not properly authenticated or is not secure within the network, the background color may change to red or another color or display mode indicative that this matter requires further user attention. Similar indicia for low battery power or other annunciators requiring user actions reside within the scope of the invention.

Figure 12D:
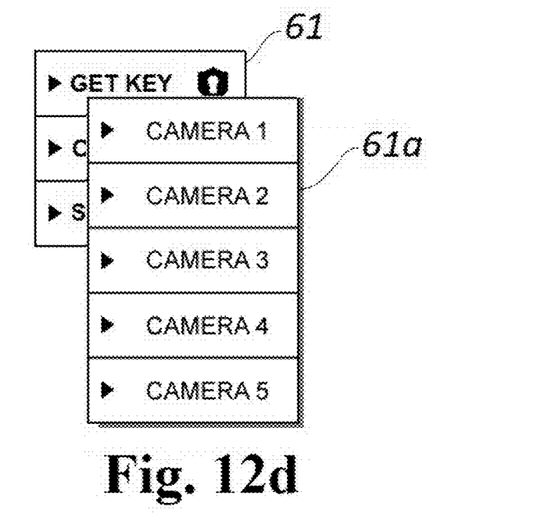
FIG. 12d shows a corollary touch sensitive region appearing and appended from a selection made by a user's touch contact in the touch sensitive region of FIG. 12c.

FIG. 12d shows a corollary touch sensitive region appearing and appended from a selection made by a user's touch contact in the touch sensitive region of FIG. 12c. In this example shown, a user is able to view a list of a plurality of cameras connected and authenticated to the secure wireless network of the invention, and able to select the "first camera" to become the camera under the control of the touch sensitive areas for controlling its orientation, and for the video datastream to be displayed to this user.

Figure 12E:
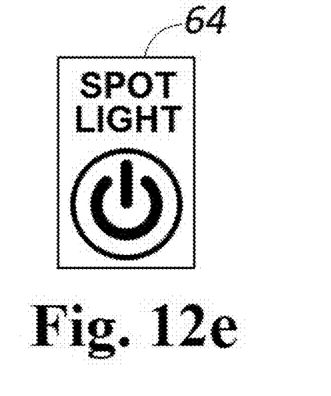
FIG. 12e shows a stylized representation of a third touch sensitive region defined and displayed in accordance with the invention.

FIG. 12e shows a stylized representation of a third touch sensitive region [64] defined and displayed by the second processor in accordance with the invention. This third touch sensitive area detects a user's contact and toggles an illuminated state of the light source between a powered ("on") state and an unpowered ("off") state. The indicia and coloring of this region may be changed by the second processor to indicate the illuminated or not illuminated state of the spotlight attached to the camera.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A camera pointing facility, comprising:
a base,
a frame rotatably coupled to said base so as to define a first axis of rotation for said frame,
a first motor attached to said base and operably coupled to said frame,
a first camera operable to generate a video datastream and mounted to said frame,
a first processor operable to compute and transmit as data an azimuth orientation of said frame with respect to said base, and
a second processor operable to receive said video datastream from said first camera, operably coupled to a touch sensitive display screen, and operable to:
 display on said display screen said video datastream from said first camera,
 define and display a first touch sensitive region, and within said first touch sensitive region
 define an origin with an ordinate and an abscissa both passing through said origin, and
 upon operating to detect a contact point of a user's touch within said first touch sensitive region, said second processor is further operable to:
  display a first cursor at a location of said user's contact point,
  mathematically determine a target angle between said ordinate and a line passing through said origin and said contact point, and
  to determine a first distance from said ordinate to said contact point and to determine a second distance from said abscissa to said contact point.

2. The camera pointing facility of claim 1,
wherein a processor from among said first and second processor is operable to determine a difference between said azimuth orientation of said frame and said target angle, and to actuate said first motor to rotate and orient said frame to said target angle.

3. The camera pointing facility of claim 1,
wherein said camera is mounted to said frame by a gimbal rotatable about a second axis perpendicular to said first axis of rotation of said frame, and further comprising a second motor operably coupled to rotate said camera about said second axis, with said first processor operable to compute and transmit as data an elevation orientation of
said camera with respect to said frame, and with said second processer further operable to define and display on said display screen a second touch sensitive region, and within said second touch sensitive region to display a slider having a second cursor slidable along a slide axis, said second cursor displayed at a point along said slide axis analogous to said elevation orientation of said camera, and upon operating to detect a contact point of a user's touch within said second touch sensitive region, said second processor is further operable to move said second cursor to a location of said user's contact point, and mathematically determine a target elevation for said camera.

4. The camera pointing facility of claim 3,
wherein a processor from among said first and second processor is operable to determine a difference between said elevation orientation of said camera and said target elevation, and to actuate said second motor to rotate and orient said camera to said target elevation.

5. The camera pointing facility of claim 1,
wherein said base further comprises a magnetic material.

6. The camera pointing facility of claim 1,
wherein said motor is a stepper motor.

7. The camera pointing facility of claim 1,
further comprising a spur gear attached to a drive shaft of said motor.

8. The camera pointing facility of claim 1,
further comprising an optical encoding sensor operably connected to said first processor, and with said further comprising an optical encoder pattern.

9. The camera pointing facility of claim 1,
further comprising a secure wireless network, and wherein said camera is a first camera among a plurality of cameras connected and authenticated to said secure wireless network.

10. The camera pointing facility of claim 9,
wherein said first processor configures a first software socket and said second processor configures a second software socket, and said video datastream from said camera is transmitted from said first processor to said second processor.

11. The camera pointing facility of claim 9,
wherein said first processor configures a third software socket and said second processor configures a fourth software socket, and motor articulation commands are transmitted from said second processor to said first processor.

12. The camera pointing facility of claim 1,
wherein said camera is a long wavelength thermal imaging camera.

13. The camera pointing facility of claim 1,
further comprising a light source with a light emission axis parallel to an optical axis of said camera.

14. The camera pointing facility of claim 13,
wherein said second processor is operable to define and display on said display screen a third touch sensitive area within which a user contact toggles an illuminated state of said light source.

15. The camera pointing facility of claim 1,
further comprising a slip ring connector between said base and said frame.

16. The camera pointing facility of claim 1,
further comprising a first sensor affixed to said frame and a first sensor triggering element on said base which triggers said first sensor when said frame is oriented about said first axis with said first sensor proximate to said first sensor triggering element.

17. The camera pointing facility of claim 3,
further comprising a second sensor affixed to said frame and a second sensor triggering element on said camera which triggers said second sensor when said camera is oriented about said second axis with said second sensor proximate to said second sensor triggering element.

18. A camera pointing facility, comprising:
a base,
a frame rotatably coupled to said base so as to define a first axis of rotation for said frame,
a first motor attached to said base and operably coupled to said frame,
a first camera operable to generate a video datastream and mounted to said frame,
a first processor operable to compute and transmit as data an azimuth orientation of said frame with respect to said base, and
a second processor operable to receive said video datastream from said first camera, operably coupled to a touch sensitive display screen, and operable to:
display on said display screen said video datastream from said first camera,
define and display a first touch sensitive region, and within said first touch sensitive region
define an origin with an ordinate and an abscissa both passing through said origin, and
upon operating to detect a contact point of a user's touch within said first touch sensitive region, said second processor is further operable to:
display a first cursor at a location of said user's contact point,
mathematically determine a target angle between said ordinate and a line passing through said origin and said contact point, and
wherein a processor from among said first and second processor is operable to determine a difference between said azimuth orientation of said frame and said target angle, and to actuate said first motor to rotate and orient said frame to said target angle.

19. The camera pointing facility of claim 18, wherein a processor from among said first and second processor is operable to determine a first distance from said ordinate to said contact point and to determine a second distance from said abscissa to said contact point.

20. The camera pointing facility of claim 18, wherein said camera is mounted to said frame by a gimbal rotatable about a second axis perpendicular to said first axis of rotation of said frame, and further comprising a second motor operably coupled to rotate said camera about said second axis, with said first processor operable to compute and transmit as data an elevation orientation of said camera with respect to said frame, and with said second processor further operable to define and display on said display screen a second touch sensitive region, and within said second touch sensitive region to display a slider having a second cursor slidable along a slide axis, said second cursor displayed at a point along said slide axis analogous to said elevation orientation of said camera, and upon operating to detect a contact point of a user's touch within said second touch sensitive region, said second processor is further operable to move said second cursor to a location of said user's contact point, and mathematically determine a target elevation for said camera.

21. The camera pointing facility of claim 20, wherein a processor from among said first and second processor is operable to determine a difference between said elevation orientation of said camera and said target elevation, and to actuate said second motor to rotate and orient said camera to said target elevation.

22. The camera pointing facility of claim 18, wherein said base further comprises a magnetic material.

23. The camera pointing facility of claim 18, wherein said motor is a stepper motor.

24. The camera pointing facility of claim 18, further comprising a spur gear attached to a drive shaft of said motor.

25. The camera pointing facility of claim 18, further comprising an optical encoding sensor operably connected to said first processor, and with said further comprising an optical encoder pattern.

26. The camera pointing facility of claim 18, further comprising a secure wireless network, and wherein said camera is a first camera among a plurality of cameras connected and authenticated to said secure wireless network.

27. The camera pointing facility of claim 26, wherein said first processor configures a first software socket and said second processor configures a second software socket, and said video datastream from said camera is transmitted from said first processor to said second processor.

28. The camera pointing facility of claim 26, wherein said first processor configures a third software socket and said second processor configures a fourth software socket, and motor articulation commands are transmitted from said second processor to said first processor.

29. The camera pointing facility of claim 18, wherein said camera is a long wavelength thermal imaging camera.

30. The camera pointing facility of claim 18, further comprising a light source with a light emission axis parallel to an optical axis of said camera.

31. The camera pointing facility of claim 30, wherein said second processor is operable to define and display on said display screen a third touch sensitive area within which a user contact toggles an illuminated state of said light source.

32. The camera pointing facility of claim 1, further comprising a slip ring connector between said base and said frame.

33. The camera pointing facility of claim 1, further comprising a first sensor affixed to said frame and a first sensor triggering element on said base which triggers said first sensor when said frame is oriented about said first axis with said first sensor proximate to said first sensor triggering element.

34. The camera pointing facility of claim 20, further comprising a second sensor affixed to said frame and a second sensor triggering element on said camera which triggers said second sensor when said camera is oriented about said second axis with said second sensor proximate to said second sensor triggering element.

\* \* \* \* \*